(12) United States Patent
Matsuhashi

(10) Patent No.: US 7,322,120 B2
(45) Date of Patent: Jan. 29, 2008

(54) TOOL DAMAGE DETECTION DEVICE

(75) Inventor: Akira Matsuhashi, Tachikawa (JP)

(73) Assignee: Metrol Co., Ltd., Tachikawa-Shi, Tokyo (JP)

( * ) Notice: Subject to any disclaimer, the term of this patent is extended or adjusted under 35 U.S.C. 154(b) by 173 days.

(21) Appl. No.: 11/223,120

(22) Filed: Sep. 12, 2005

(65) Prior Publication Data

US 2006/0114117 A1    Jun. 1, 2006

(30) Foreign Application Priority Data

Nov. 30, 2004   (JP)   ............... 2004-347683

(51) Int. Cl.
*B23B 49/00* (2006.01)
(52) U.S. Cl. .......................... 33/626; 33/628
(58) Field of Classification Search ................ 33/626, 33/628; 83/522.15
See application file for complete search history.

(56) References Cited

U.S. PATENT DOCUMENTS

| 3,647,998 A | * | 3/1972 | Rohaff, Sr. | ............... 408/6 |
|---|---|---|---|---|
| 4,056,329 A | | 11/1977 | Perry | |
| 4,426,177 A | * | 1/1984 | Perry | ............... 408/8 |
| 2007/0022619 A1 | * | 2/2007 | Matsuhashi | ............... 33/628 |

FOREIGN PATENT DOCUMENTS

| JP | 06-126598 | 5/1994 |
|---|---|---|
| JP | 2001-038512 | 3/2001 |
| JP | 2003-001549 | 8/2003 |

* cited by examiner

*Primary Examiner*—Yaritza Guadalupe-McCall
(74) *Attorney, Agent, or Firm*—Manabu Kanesaka

(57) ABSTRACT

A tool damage detection device which detects the presence or absence of damage, has a contact bar rotatably supported on a casing; a pneumatically operated air drive device operatively connected with a supply of air under pressure; and a linear-to-rotational motion conversion device operatively interconnects the contact bar and the direct-air drive device. A resilient member is interposed between the contact bar and the conversion device.

8 Claims, 5 Drawing Sheets

TOOL DAMAGE DETECTION DEVICE

BACKGROUND OF THE INVENTION AND RELATED ART STATEMENT

The present invention relates to a tool damage detection device or the like.

An example of a conventional tool damage detection device is disclosed in Japanese Patent Publication No. TOKKAI 2001-38512. As shown in FIG. 6, this detection device is such that an electric motor 50 is used to detect whether or not a contact bar 51 contacts a body part of a tool 52 which lies within an arc of the contact bar 51. When the contact bar 51 passes without contacting the body part of the tool 52, the electric motor 50 senses this as a "damage" situation, and outputs a warning or a stop signal to a machine control section (not shown in the figure).

However, the above-mentioned detector is often used under circumstances wherein a great amount of cutting agents (liquid) come into contact with the detector, or a mist of cutting agent is filled in the air. Since the cutting agents contain considerable amounts of surfactant, they exhibit extremely high permeability and causticity characteristics. As a result, it is necessary to improve the waterproofing of a bearing of the detector. To do this, it is necessary to provide increased amounts of waterproofing which include the use of rubber O-rings, packing, V-seals and so on. However, these measures induce a shortcoming that the resulting friction resists the rotation of the contact bar and the torque output is reduced.

Also, in the case of the above-mentioned detector, since the cutting agents contain surfactants, they exhibit high levels of permeability and causticity. As a result, the durability of the control motor is significantly reduced due to problems such as failure of the motor coil winding insulation or heat generation due to electric overload. Moreover, an expensive electric control section is required. Additionally, detection of any damage (chipping) due to contact with the edge (slope portion) of the tool which lies within the range of the turning of the contact bar, is almost impossible.

The present invention has been proposed in order to solve the above-mentioned problems. The object of the present invention is, therefore, to provide a tool damage detection device which can detect damage of the body part or edge of the tool without problem occurring due to the penetration of the cutting agents or electric overload which result from the provision of waterproofing measures.

Further objects and advantages of the invention will be apparent from the following description of the invention.

SUMMARY OF INVENTION

In order to achieve the above-mentioned purpose, a tool damage detection device according to a first aspect of the present invention detects the presence or absence of damage through the contact of a contact bar which projects in an orthogonal direction from a rotational axis projecting from the main body case, with a tool, and outputs a signal when damage is detected. The rotational axis is rotated by a direct-acting air driving (pneumatically operated) device, so that the durability of the tool damage detection device is not affected by penetration of cutting agents.

Also, in the tool damage detection device according to a second aspect of the present invention, a resilient member such as a torsion spring is used to provide an operative drive connection between the rotational member on which the contact bar is supported and the pneumatically powered direct-acting air driving member. This provision enables impact between the tool and the contact bar to be attenuated.

In addition, in the tool damage detection device according to a third aspect of the present invention, a plunger type contact sensor which detects damage of an edge of the tool, is provided in an outboard end of an arm bar projecting in an orthogonal direction from the rotational axis projecting from the main body case. The tool damage detection device can detect the damage by the amount the edge of the tool is displaced with respect to a sensor contact face.

In the invention according to the first aspect, since the contact bar is rotated by the direct-acting air driving device, there is no need for an electrical control motor. As a result, there is no negative effect due to the penetration of the cutting agents (liquid) containing surfactants or the like. Therefore, the embodiments of the invention can be used without encountering the above mentioned types of problem even in circumstances wherein large amounts of cutting agents (liquid) come into contact with the detector or the detector is exposed to clouds of cutting agents which have been dispersed into the air.

Also, with the embodiments according to the second aspect of the invention, the rotational axis rotates with the sensor part detecting the rotational angle of the contact bar through the coil spring from the rotating member rotating by the direct-acting air driving member, and the contact bar contacts a body of the tool. As a result, the force with which the tool is contacted can be maintained at an adequate level while the impact with the tool can be decreased.

Moreover, with embodiments of the third aspect of the invention, a plunger type contact sensor provided in the arm bar projecting in the orthogonal direction from the rotational axis projecting from the main body case is rotated and stopped at the position corresponding to the edge of the tool. Therefore, these embodiments can detect the damage according to the amount of displacement which occurs until the edge of the tool contacts the sensor contact face.

DETAILED DESCRIPTION OF PREFERRED EMBODIMENTS

Figure 1:
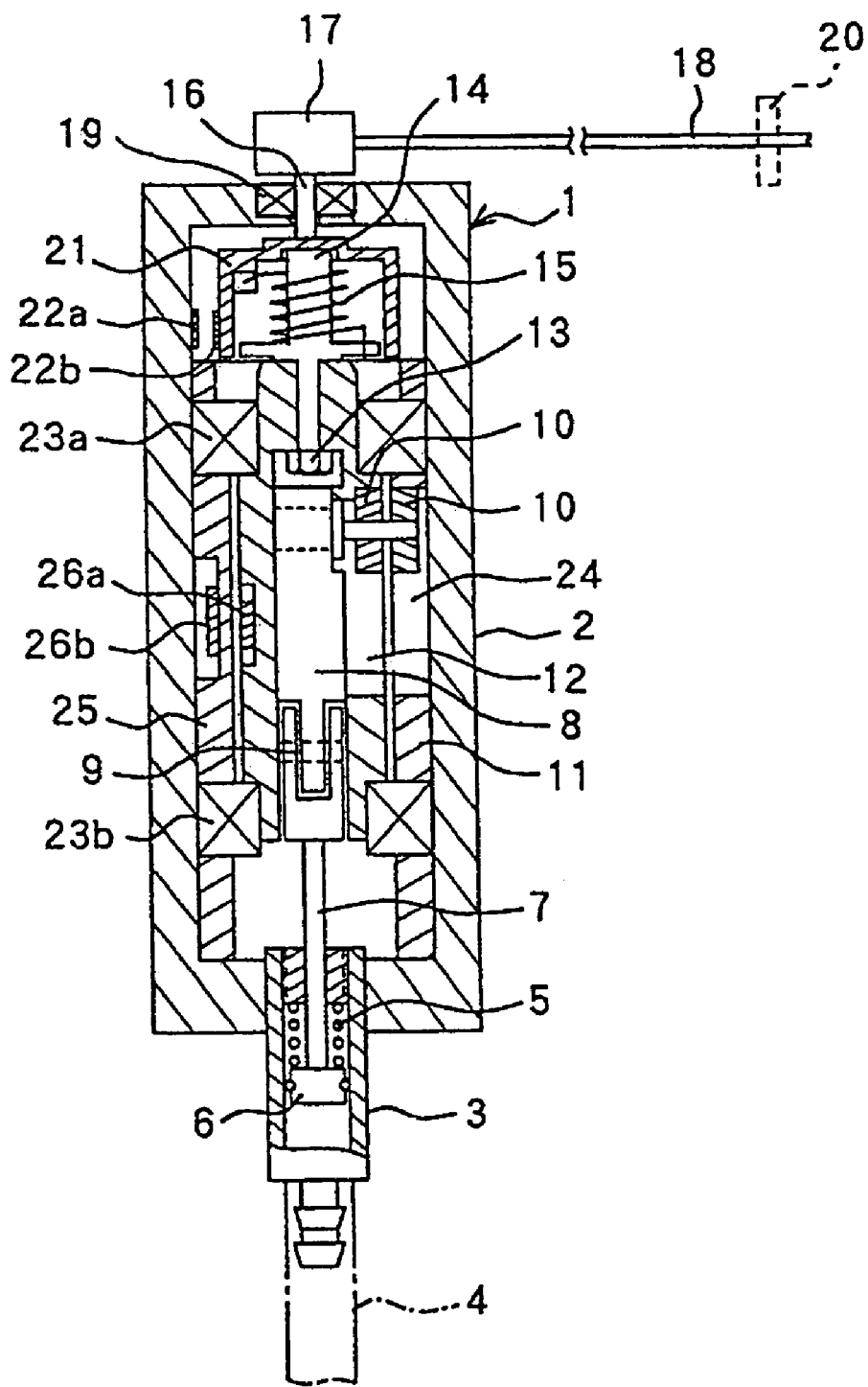
FIG. 1 is a sectional view of a device which in accordance with one embodiment of the present invention is provided with a vertically arranged direct-acting air driving member.
Figure 2:
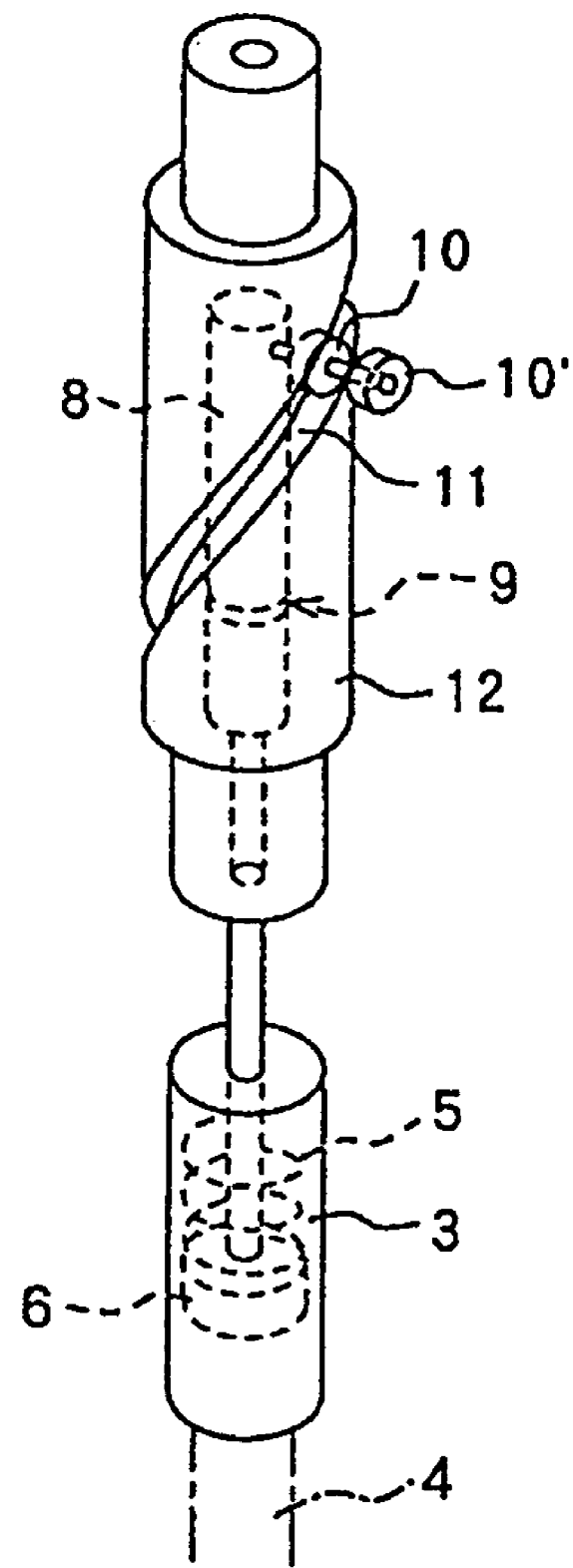
FIG. 2 is a perspective view of a rotating cam tube which converts the linear motion of the direct-acting air driving member into rotational motion.
Figure 3:
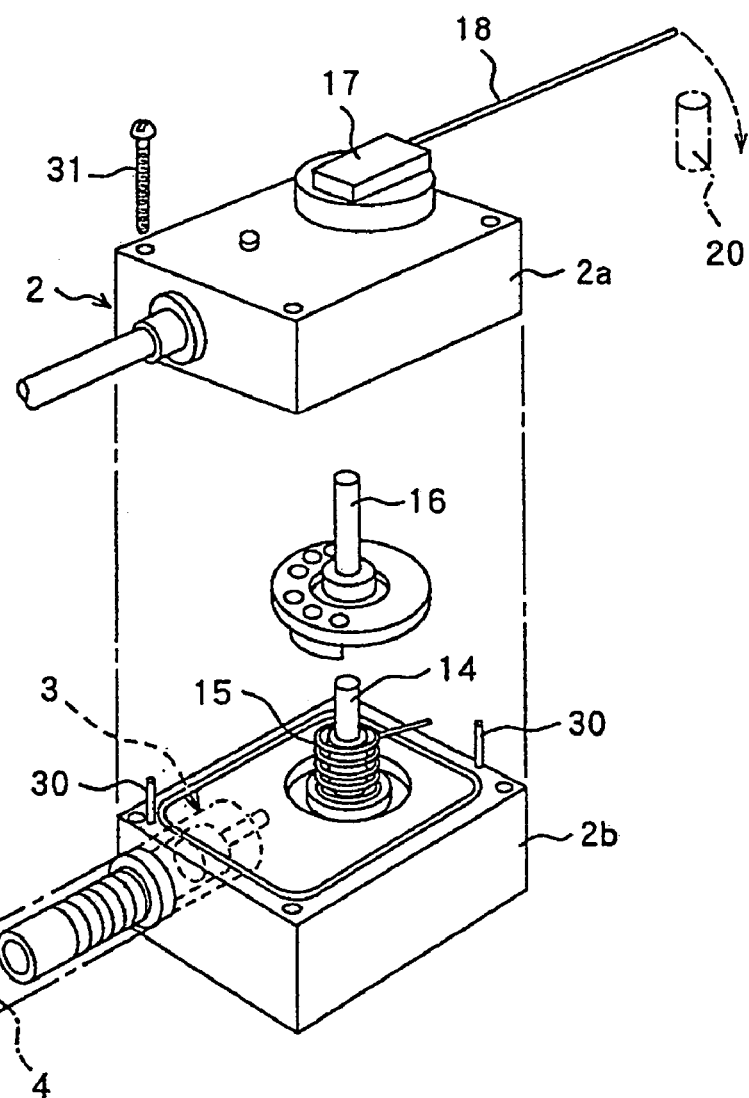
FIG. 3 is an exploded perspective view of a device which in accordance with one embodiment of the invention is provided with a horizontally arranged direct-acting air driving member.
Figure 4:
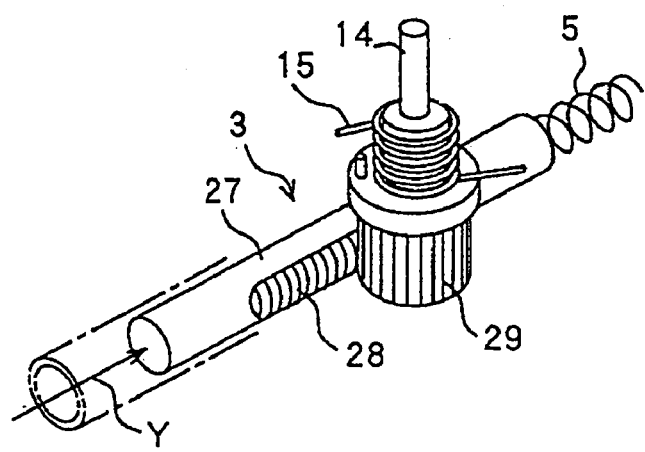
FIG. 4 is a perspective view showing a rack (and pinion) arrangement which converts linear motion of the direct-acting air driving member into rotational motion.
Figure 5:
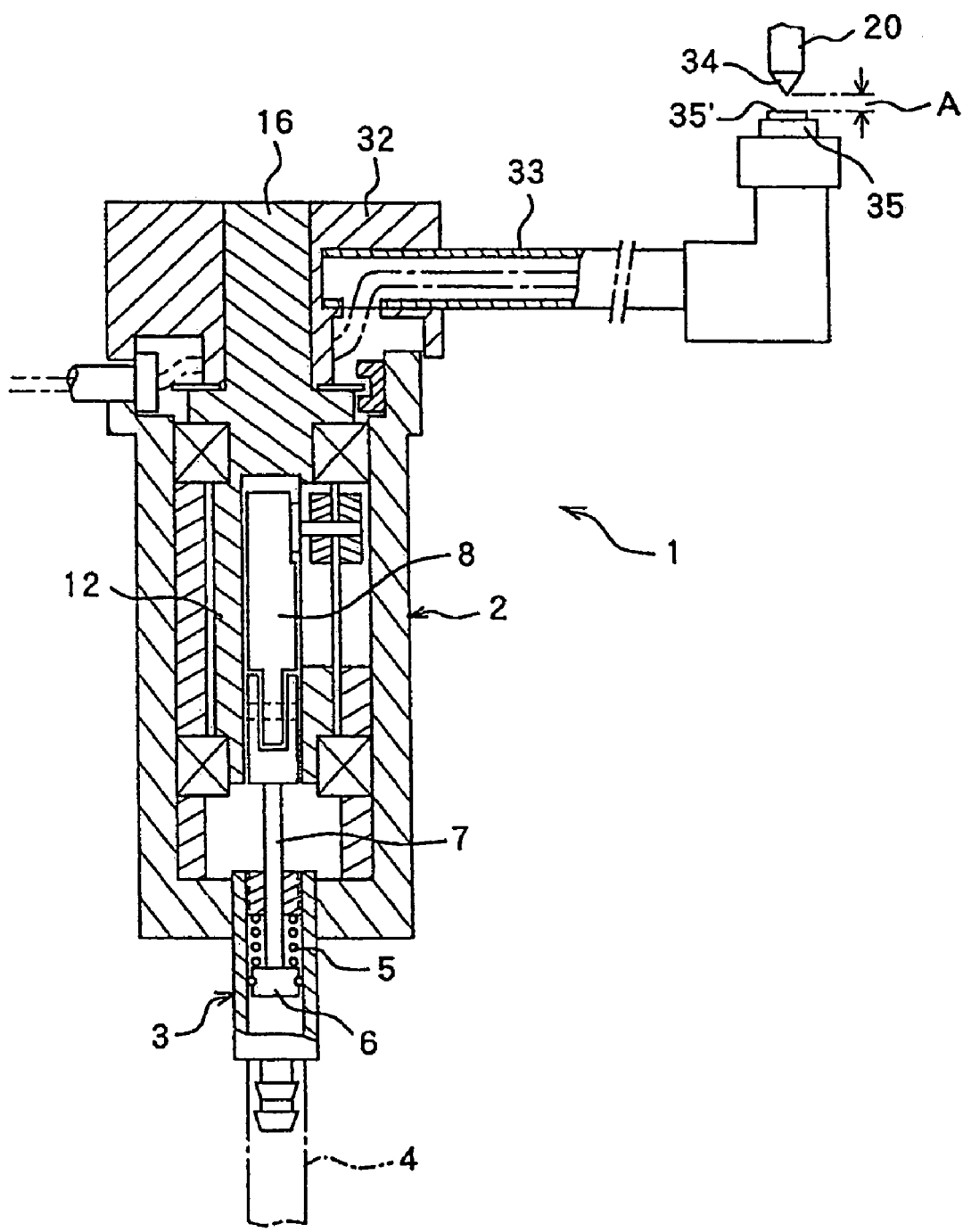
FIG. 5 is a sectional view of a third embodiment of the invention which uses a plunger type contact sensor.
Figure 6:
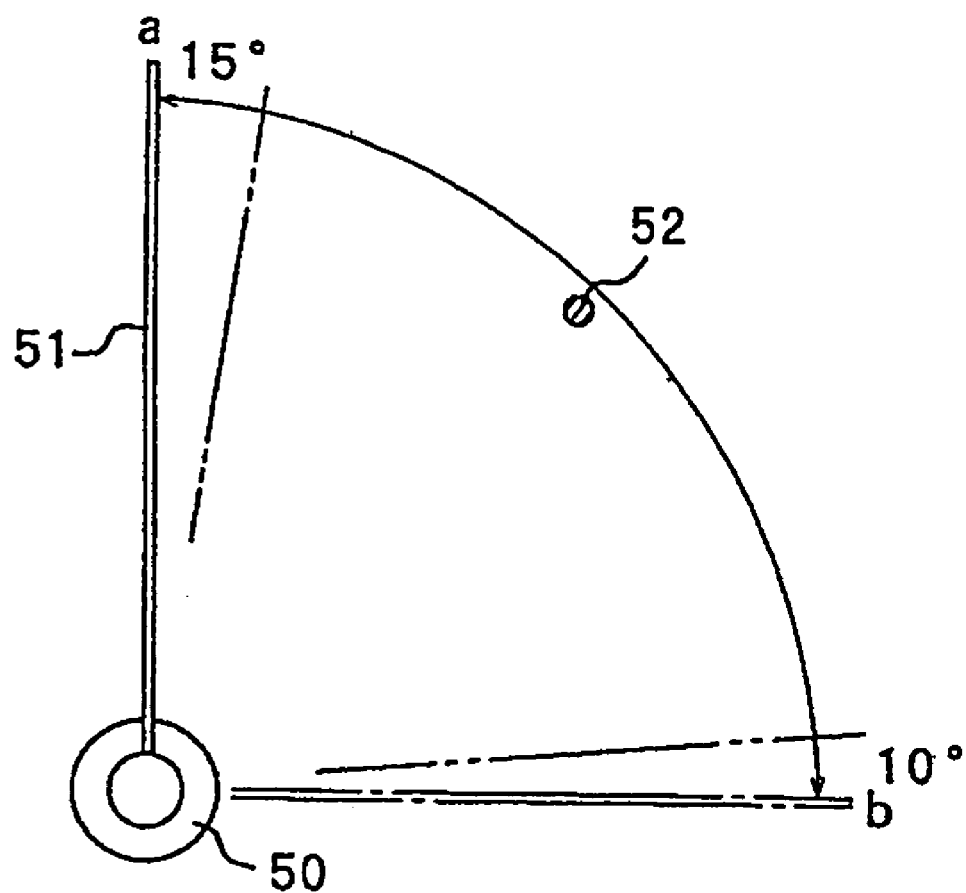
FIG. 6 illustrates a relationship between the rotation of a contact bar of a conventional device and a tool, which was discussed in the opening paragraphs of the instant disclosure.

Next, an embodiment of the present invention will be explained with reference to the drawings. FIG. 1 is a sectional view of an embodiment of the invention which is provided with what shall be referred to as a vertically or axially acting direct-acting air driving; FIG. 2 is a perspective view showing a rotating cam tube which converts the linear motion of movement of the direct-acting air driving member into rotational motion; FIG. 3 is an exploded perspective view of an embodiment of the invention which is provided with what shall be referred to as a horizontally or laterally acting direct-acting air driving member; FIG. 4 is a perspective view of a rack and pinion arrangement which converts the linear motion of the laterally acting direct-acting air driving member into rotational motion; and FIG. 5 is a cross sectional view of the device with a plunger type contact sensor according to the present invention.

In FIG. 1, the numeral 1 denotes an embodiment of the invention which is provided with a vertically acting direct-acting air driving unit 3 which operates in an axial direction of a main case body or casing 2 and which is disposed below the casing 2. The direct-acting air driving unit 3 allows a piston 6 to move upward against the bias of a spring 5 in accordance with pressurized air which is supplied through an air hose 4 that is communicated with a source of air under pressure such as an air compressor/valve arrangement (not shown in the figures). When the piston 6 moves upward, a piston or plunger 8 is driven upward via the connecting rod 7. On the other hand, when there is no pressurized air supplied through the air hose 4, the plunger 8 returns to its former position under the influence of the bias applied by spring 5.

In FIGS. 1 and 2, the plunger 8 is shown to be connected with the piston 6 through the connecting rod 7 and a flexible joint 9 which absorbs any offset between the centers of the piston 6 and the plunger 8. If offset is not an issue, then the plunger 8 can be connected with the piston 6 without the flexible joint 9.

When the plunger 8 moves upward by actuation of the direct-acting air driving unit 3, a roller 10 which is axially supported on the plunger 8, drives a rotating cam tube 12 to rotate about an axis along which the plunger 8 is reciprocal, via engagement with a spiral (helical) cam groove 11 in which the roller 10 is received (slides) and thus functions as a cam follower. The rotation of the rotating cam tube 12 drives a rotatable member 14 to rotate. The rotatable member 14 is united with the rotating cam tube 12 through connecting means 13.

The above-described rotatable member 14 drives a sensor drive shaft 16 to rotate through a connection which is established via a coil spring (torsion coil spring) 15. The sensor drive shaft 16 projects out through an upper surface of the casing 2. The upper end of the sensor drive shaft 16 is connected with a contact bar 18 which projects at right angles through a cap member 17 that covers the sensor drive shaft 16.

The contact bar 18 is arranged to contact a body part (side face) of a tool 20 while it is rotating. The contact bar 18 is rotated by way of the torsion which is applied by the coil spring 15, via the rotation of the rotatable member 14 which is induced by the direct-acting air driving unit 3. This allows the sensor drive shaft 16 to detect the, rotational angle via the rotation of the contact bar 18 and the generation of contact force between the contact bar and the tool 20. In this case, the contact bar 18 contacts the body part of the tool 20 with a relatively low contact force and thus reduces shock to the tool 20.

The sensor drive shaft 16 is supported by the casing 2 through a bearing 19. Also, a hub-like base portion 21 of the sensor drive shaft 16 has a drum-shape and encloses the rotatable member 14. One end of the coil spring 15 is connected with the drum-like base portion 21, and the other end is connected with the rotatable member 14 respectively.

The rotation of the rotatable member 14 rotated by the actuation of the direct-acting air driving unit 3 is transmitted to the sensor drive shaft 16 through the coil spring 15 as noted above. As a result of this structure, when the contact bar 18 contacts the body part of the tool 20 and stops, the rotatable member 14 continues to rotate only for a predetermined rotational angle with the rotating cam tube 12.

A magnetic switch 22a and a magnet 22b are arranged to form a non-contact switch between the inner circumference of the casing 2 and the outer circumference of the base portion 21 of the drive shaft 16. When the contact bar 18 does not contact the body part of the tool 20 in the middle of the rotation, the magnetic switch 22a and the magnet 22b senses it as "damaged", and output a "damaged signal". This signal output circuit is not shown in the drawings. On the contrary, when the contact bar 18 contacts the body part of the tool 20 in the middle of the rotation, the tool is judged as "normal".

Top and bottom end portions of the rotating cam tube 12 are supported on the inner circumference of the casing 2 through bearings 23a, 23b, so that smooth rotation is assured. A tube member 25 with a straight or linear groove 24 is provided on the outside of the rotating cam tube 12 (inner circumferential face of the casing 2). The straight groove 24 guides an external roller 10' which has the same axis as the roller 10 axially supported by the plunger 8 in the vertical direction. The straight groove 24 of the tube member 25 may be formed directly on the inner circumferential face of the casing 2. In addition, the straight line groove 24 is made in order to guide the plunger 8 in a vertical direction with the actuation of the direct-acting air driving unit 3. However, it may be changed to another structure without departing from the scope of the invention.

The rotating cam tube 12 is rotated by moving the plunger 8 up and down with the actuation of the direct-acting air driving unit 3. However, the rotational angle of the rotating cam tube 12 is determined by the sliding length (stroke) of the piston 6 of the direct-acting air driving unit 3. The stroke is required to have a certain length because an angle of the spiral or helical groove 11 is increased in order to reduce resistance during the rotation. In this embodiment, the above-mentioned condition is also taken into account.

The non-contact switch consisting of a magnetic switch 26a and a magnet 26b is provided on a tube or sleeve member 25 which forms an outer wall of the rotating cam tube 12 and in which the linear groove 24 is formed. This enables the output of the positional signals representing an original (start) point and ending point of the rotation of the rotating cam tube 12. In this instance also, the output circuit of the positional signals of the rotating cam tube 12 is not shown in the figure.

The direct-acting air driving unit 3 uses pressurized air to rotate the contact bar 18 toward a stop-end from the original point. The contact bar 18 rotates under the influence of the bias provided by the spring 5 between the stop-end and the original point.

However, when the direct-acting air driving unit 3 rotates toward the stop-end from the original point, spring force can be used, and air can be used between the stop-end and the original point. Also, the direct-acting air driving member can be replaced with a double-acting air driving machine.

A second embodiment of the invention is shown in FIGS. 3 and 4. In this second embodiment direct-acting air driving unit 3 is arranged to operate in the horizontal (i.e. lateral) direction with respect to the casing 2 as shown. The direct-acting air driving unit 3 in this embodiment advances a sliding member 27 in the direction of Y against the spring force of the spring 5 shown in FIG. 4 by the air supplied through the air hose 4 communicated with the air compressor (not shown in the figures). When there is no air supply through the air hose 4, the sliding member 27 returns to the former position under the bias of spring 5 which has become compressed by the pneumatically induced stroke.

When the sliding member 27 advances, the rotatable member 14 is rotated through a rack 28 forming the body part of the sliding member 27 and a pinion 29 which engages with the rack 28. The rotatable member 14 continuously rotates the drive shaft 16 projecting from the upper surface of the casing 2 through the coil spring 15. The drive shaft 16, is connected with the contact bar 18 so that it projects at right angles through the cap member 17 covering the upper end of the drive shaft 16. As in FIG. 1, when the contact bar 18 does not contact the body part of the tool 20 in the middle of the rotation, the contact bar 18 outputs the "damaged" signal.

The casing 2 shown in FIG. 3, consists of box-shaped upper and lower casing portions 2a, 2b which are positioned respect to one another by positioning pins 30 and corresponding pin holes (not shown in the figure). The upper and lower portions 2a, 2b are fixed by screw bars 31 in plural positions. As in FIG. 1, the casing 2 allows the contact bar 18 to rotate through the coil spring 15 from the direct-acting air driving unit 3 and generate the necessary contact force when the contact bar rotates to contact the tool 20. Also, the casing 2 can reduce the shock to the tool quickly.

A third embodiment of the invention is shown in FIG. 5. In this embodiment, the arm bar is, which by way of example, comprised of a tubular member 33 and a plunger type contact sensor 35. The arm bar 33 is connected to the sensor drive shaft 16 which projects out of the casing 2, and projects in an orthogonal direction through a boss unit 32. The plunger type contact sensor 35 detects the damage of an edge 34 (in this example, the sloping edge represents a cutting portion), by allowing the arm bar 33 to contact the edge 34 of the tool 20. In addition, the edge (slope=cutting portion) 34 of the tool 20 is not limited to downwardly curving elements in the manner illustrated.

The rotational angle of the sensor drive shaft 16 is determined by the spiral or helical angle of the spiral groove 11 of the rotating cam tube 12 which is integrated with the rotational angle of the sensor drive shaft 16. In other words, when the piston 6 moves up against the spring force of the spring 5 in response to pressurized air being supplied through the air hose 4 wherein the direct-acting air driving unit 3 is communicated with the air compressor (not shown in the figure), the plunger 8 is pushed up by way of the connecting bar 7. As a result, the rotating cam tube 12 rotates in a horizontal direction through the spiral groove 11 wherein the roller 10 axially supported by the vertical axis 8 fits (slides). Also, the drive shaft 16 integrated with the rotating cam tube 12 rotates (revolves) in the horizontal direction only for a certain angle.

However, if the starting and ending points of rotation of the arm bar 33 projecting in the orthogonal direction through the boss unit 32 are predefined in the sensor drive shaft 16 during the actuation of the direct-acting air driving unit 3, a center of a sensor contact face 35' of the plunger type contact sensor 35 with the arm bar 33 can be precisely stopped directly beneath the edge 34 (corresponding position) of the tool 20. In this case, the length of the arm bar 33 has to be predefined.

The plunger type contact sensor 35 predefines a distance A between the sensor contact face 35' and the edge 34 of the tool 20 at the ending point of the rotation of the arm bar 33. If the displacement amount of the edge 34 of the tool 20 relative to the sensor contact face 35' is the same as the above-mentioned defined distance during the detection, the plunger type contact sensor 35 senses that it is "normal". On the other hand, if the displacement amount of the edge 34 of the tool 20 is large, the plunger type contact sensor 35 senses it as "damaged", and outputs the damaged signal. The output circuit in this case is not illustrated.

Next, operation of the device 1 according to this embodiment of the present invention with the direct-acting air driving unit 3 which operates in the vertical or axial direction will be explained.

First, air under pressure is supplied from an air compressor or any other suitable source of air under pressure (not shown in the figure) via (for example) a valve or the like. The pressurized air is supplied in the direct-acting air driving unit 3 through the air hose 4 communicated with the pressurized air source (e.g. air compressor). The piston 6 drives the plunger 8 up against the bias of the spring 5. In an upper movement of the plunger 8, the rotating cam tube 12 rotates due to the provision of the roller 10 which is supported on the plunger 8. The rotatable member 14 rotates by this rotation, and the contact bar 18 projecting on the drive shaft 16 rotates via the torque which is applied through the coil spring 15, and revolves toward the stop-end from the original point. When the contact bar 18 hits the body part of the tool 20 in the middle of the revolution, the contact bar 18 stops. However, the rotatable member 14 still continues to rotate a little further for predetermined rotational angle with the rotating cam tube 12.

As mentioned in the above, when the contact bar 18 contacts the body part of the tool 20 in the middle of the revolution, the device 1 outputs "normal". When the contact bar 18 passes without contacting the body part of the tool 20, the device 1 outputs the "damaged" signal by the operation of the magnetic switch 22a and the magnet 22b provided between the base portion of the sensor drive shaft 16 and the case main body. In addition, in this embodiment of the invention, the magnetic switch is used for the signal output. However, the embodiments of the invention are not limited to the use of this type of magnetic switch, and can take the form of contact switches or the like, provided sufficient waterproofing is provided. Also, in the illustrated embodiments, the contact bar has been shown as rotating clockwise, however, the invention is not so limited and the contact bar can rotate tool counterclockwise if so desired.

The embodiments of the invention can be attached to a machine tool such as an automobile, private plane and so on and used as a detection sensor for the damage of the tool or a loss of the edge. Also, since the device 1 of the invention does not use an electric motor, the embodiments of the invention can be used under circumstances wherein a large amounts of cutting agents come in contact with the device and also operate under conditions wherein air is filled with a mist of cutting agents, without difficulty.

Although the invention has been described with reference to only a limited number of embodiments the various modifications and variations which are possible without departing from the scope of the present invention, which is limited only the appended claims, will be self-evident to a person of skill in the art to which the present invention pertains or most closely pertains, given the preceding disclosure.

The disclosures of Japanese Patent applications No. 2004-32756 filed on Feb. 9, 2004 and No. 2004-347683 filed on Nov. 30, 2004 are incorporated herein.

What is claimed is:

1. A tool damage detection device for detecting presence or absence of damage, comprising:
   a casing,
   a contact bar rotatably arranged on the casing to contact a tool to be detected,
   a pneumatically operated air drive device operatively connected with a supply of air, said pneumatically operated air drive device having a linearly movable piston, and
   a linear-to-rotational motion conversion device disposed in the casing and having a rotating cam, said rotating cam being interconnected with the piston and the contact bar so that a linear motion by the piston is converted to a rotational motion by the rotating cam to rotate the contact bar around the casing to detect the presence or absence of damage.

2. A tool damage detection device as set forth in claim 1, further comprising a non-contact magnetic switch arrangement which is responsive to rotation of the drive shaft with respect to the casing on which the contact bar is supported.

3. A tool damage detection device as set forth in claim 1, further comprising a plunger type contact sensor which is configured to detect damage of an edge of the tool, the plunger type contact sensor being disposed in an outboard end of the contact bar.

4. A tool damage detection device as set forth in claim 1, wherein said rotating cam has a helical shaped cam groove and the piston moves upward and downward along the helical shaped cam groove on the rotating cam so that said rotating cam rotates the contact bar.

5. A tool damage detection device for detecting presence or absence of damage, comprising:
   a casing,
   a contact bar rotatably arranged on the casing to contact a tool to be detected,
   a pneumatically operated air drive device operatively connected with a supply of air, and
   a linear-to-rotational motion conversion device disposed in the casing for operatively interconnecting the contact bar and the air drive device so that the contact bar rotates around the casing by the air drive device to detect the presence or absence of damage,
   wherein the linear-to-rotational motion conversion device comprises rotational means connected to the air drive device for changing linear movement to rotational movement, a drive shaft connected to the contact bar, and a resilient member situated between the drive shaft and the rotational means for synchronous rotation therebetween with resiliency.

6. A tool damage detection device as set forth in claim 5, wherein said rotational means comprises a plunger connected to the air drive device, a cylindrical member rotationally connected to the plunger and having a helical shaped cam groove, a cam follower engaging the cam groove, and a rotation member attached to the cam follower and connected to the resilient member.

7. A tool damage detection device as set forth in claim 5, wherein said rotational means comprises a rack attached to a piston member of the air drive device, and a pinion configured to mesh with the rack and connected to the drive shaft through the resilient member.

8. A tool damage detection device as set forth in claim 5, wherein said resilient member comprise a coil torsion spring.

* * * * *